United States Patent

[11] 3,603,725

[72] Inventor Cassius Chapin Cutler
Holmdel, N.J.
[21] Appl. No. 3,069
[22] Filed Jan. 15, 1970
[45] Patented Sept. 7, 1971
[73] Assignee Bell Telephone Laboratories, Incorporated
Murray Hill, N.J.

[54] CONDITIONAL REPLENISHMENT VIDEO SYSTEM WITH REDUCED BUFFER MEMORY DELAY
12 Claims, 1 Drawing Fig.

[52] U.S. Cl. .......... 178/6,
178/DIG. 3, 179/15 BA, 179/15.55 R, 325/38 B
[51] Int. Cl. .......... H04n 7/12
[50] Field of Search .......... 325/38 B;
178/DIG. 3, 26; 179/15 BA, 15.55 R

[56] References Cited
UNITED STATES PATENTS

| | | | |
|---|---|---|---|
| 2,909,601 | 10/1959 | Fleckenstein .......... | 179/15.55 |
| 3,016,422 | 1/1962 | Lee .......... | 178/26.5 |

OTHER REFERENCES

Spencer et al.— Sampling Asynchronous Data— IBM Tech. Disclosure Bulletin— Vol. 4 No. 7— Dec. 1961— pp. 44, 45

*Primary Examiner*—Robert L. Griffin
*Assistant Examiner*—Joseph A. Orsino, Jr.
*Attorneys*—R. J. Guenther and E. W. Adams, Jr.

ABSTRACT: Amplitude samples from a video signal for an entire frame are stored in a frame memory. Each new sampled amplitude of the video signal is compared with a previously stored amplitude corresponding to the same spatial point in the video frame. If the difference between the two amplitudes exceeds a threshold value, the new amplitude replaces the old sample in the frame memory and is written into a buffer memory apparatus for storage prior to transmission to a receiving location. An address word is generated for each sample in order to indicate by its value the location of its corresponding sample within the video frame. The address word for each selected sample is also written into the buffer memory which is read on a first-in-first-out basis. The address of each new sample is compared with the address of a sample being held by the buffer memory apparatus in readiness for transmission to the receiving location. If the two addresses being compared correspond to the same spatial point in the video frame, the new sample is written into the buffer memory and the old sample is read out of the buffer memory even though the latter sample may not be coupled by the buffer memory apparatus to a transmitter for transmission to the receiving location. As a result, less delay is introduced by the buffer memory apparatus since the most recent amplitudes for the spatial points are coupled to the transmitter.

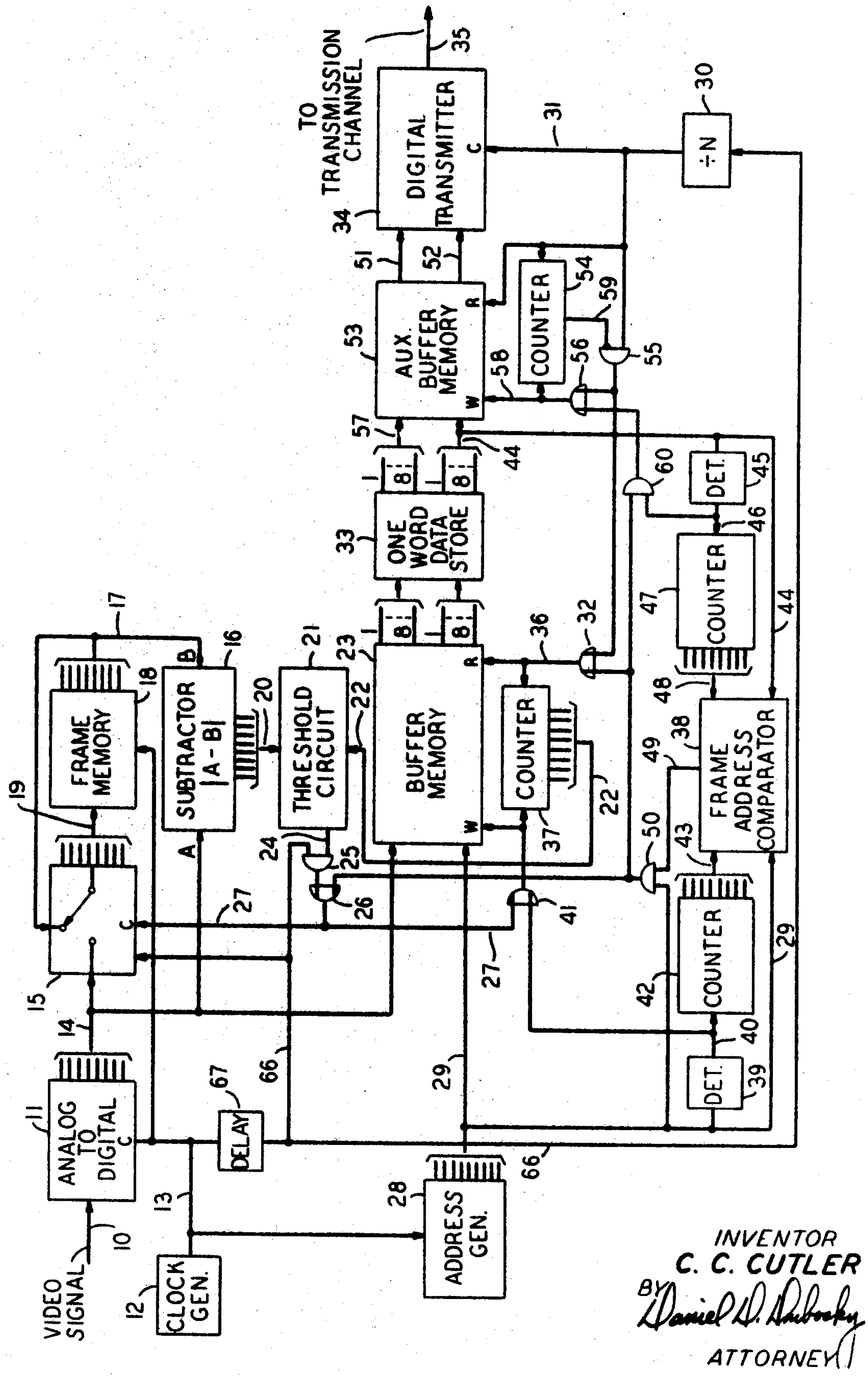
INVENTOR
C. C. CUTLER
BY Daniel D. Dubosky
ATTORNEY

CONDITIONAL REPLENISHMENT VIDEO SYSTEM WITH REDUCED BUFFER MEMORY DELAY

BACKGROUND OF THE INVENTION

This invention relates to redundancy reduction systems and, more particularly, to redundancy reduction systems which are utilized to process signals having framed intervals such as video signals.

Many of the spatial points in each frame of a television picture do not change in amplitude from one frame to the next. It is highly wasteful of transmission bandwidth to transmit the amplitude of these spatial points which do not change in amplitude, and, therefore, prior art systems have been designed which transmit only the amplitudes of spatial points which have changed significantly from some previously stored reference values such as the amplitudes for all of the spatial points in a previous video frame. In these prior art systems, a frame memory in both the receiving and transmitting locations stores a set of amplitudes corresponding to all of the spatial points in a video frame. The amplitude for any given spatial point within each of the frame memories is updated only under the condition that the new amplitude for this spatial point has changed significantly. These systems have been appropriately named by those skilled in the art as conditional replenishment video systems. This type of system has been disclosed in a copending application entitled "Redundancy Reduction System for Video Signals" by F. W. MOunts under the filing date of Aug. 2, 1968, Ser. No. 749,770.

In conditional replenishment video systems, the samples are selected for transmission at a relatively random rate depending primarily on the amount of activity which occurs in the scene being viewed. In order to interface these selected samples with a digital transmission system which is operating at a constant bit rate, the selected samples are stored in a buffer memory prior to being coupled to the digital transmitter. To prevent overflow and underflow of the buffer memory, a count of the number of samples stored in the buffer memory is generally maintained. As the buffer memory is filled toward its maximum capacity, the resulting high count value is utilized to increase the threshold level used in determining whether or not a new sample represents a significant change in amplitude. As a result, the number of samples selected for storage in the buffer memory tends to be reduced. On the other hand, if there is very little activity in the scene being viewed, the number of samples selected for storage in the buffer memory tends to decrease. The resulting decreased count value is utilized to generate a lower threshold level, thereby causing a lesser difference in amplitude between the two samples being compared to be judged as a significant difference.

Even with the threshold level control circuit, when a large amount of activity occurs in the scene being viewed a large number of samples are selected from the video frame for storage in the buffer memory. As a result, several frames of video may elapse before the digital transmitter is able to reduce significantly the number of samples stored in the buffer memory. Accordingly, a delay is introduced between the transmitting and receiving locations. This delay is undesirable, particularly in a videotelephone service since a similar delay will not occur in the audio portion of the service.

SUMMARY OF THE INVENTION

A primary object of the present invention is to reduce the amount of delay introduced by a buffer memory in a conditional replenishment video system. This object and others are achieved in accordance with the present invention wherein each new sample from a video signal is compared with a previously stored sample in a frame memory corresponding to the same spatial point in the video frame. If a significant difference in amplitude is deemed to exist between the two samples, the new sample replaces the old sample in the frame memory and, in addition, the new sample is written into a buffer memory apparatus for storage prior to transmission. As address word is generated for each sample to indicate by its value the position of its corresponding sample within the video frame; each sample written into the buffer memory apparatus is accompanied by its corresponding address word. The samples stored in the buffer memory apparatus are read out by a digital transmitter on a first-in, first-out basis at a rate which can be utilized by the transmitter. The address of each new sample is compared with a sample being held in readiness by the buffer memory apparatus before being coupled to a digital transmitter. If the two addresses represent the same spatial point within the video frame, the new sample is written into the buffer memory and the old sample is read out of the buffer memory and the old sample is read out of the memory even though the new sample may not represent a significant change in amplitude and, furthermore, even though the sample being held in readiness is not coupled to the digital transmitter.

BRIEF DESCRIPTION OF THE DRAWING

The invention will be more readily understood after reading the following detailed description, taken in conjunction with the drawing in which a schematic block diagram of one embodiment which utilizes the invention is shown.

DETAILED DESCRIPTION

In the drawing, a video signal of a standard type having line and frame intervals is coupled by way of line 10 to the input of an analog-to-digital encoder 11. A clock generator 12 produces energizing pulses on line 13 at a rate equal to that at which samples must be taken of the video signal on line 10. These energizing pulses from clock generator 12 are coupled by way of line 13 to the control input of analog-to-digital encoder 11. In response to each energizing pulse, analog-to-digital encoder 11 samples the video signal online 10 and provides a digital word on bus 14 having a value equal to the amplitude of the video signal at that sampled point. Bus 14, like all other lines in the drawing to be referred to hereinafter as "-buses," is actually constructed of a plurality of transmission paths, one path for each of the digital bits present in the digital word said to be carried on the bus.

Each digital word produced by encoder 11 on bus 14 is coupled to one input of a transmission gate 15 and also to one input of a subtractor circuit 16. The outer input of subtractor circuit 16 is presented with a digital word on bus 17 from the output of a frame memory 18. Frame memory 18 is constructed of a plurality of delay lines, one line for each of the digital bits present in each of the digital words stored in frame memory 18. The delay of each line is equal to the duration of time occupied by one frame interval of the video signal. Accordingly, each digital word coupled to the input frame memory 18 on but 19 appears at the output on bus 17 a delayed interval of time equal to the frame interval of the input video signal. Frame memory 18 is synchronized by the clock pulses on line 13 so that the digital word on but 17 occurs simultaneously with the appearance of a digital word on bus 14 corresponding to the same spatial point in the video frame.

Subtractor circuit 16 develops the absolute magnitude of the difference between the two digital words presented at its two inputs by way of bus 14 and bus 17. The absolute magnitude of the difference is presented at the output of subtractor circuit 16 in digital form and coupled by way of bus 20 to one input of a threshold circuit 21. Threshold circuit 21 compares the magnitude of the digital word on bus 20 with an internal threshold level. This threshold level is a function of the magnitude of the digital word presented on a bus 22 at a second input of threshold circuit 21. The relationship between the threshold level and the value of the digital word on but 22 is described hereinafter in connection with the number of digital words stored in a buffer memory 23.

If the magnitude of the digital word on bus 20 exceeds the threshold level, threshold circuit 21 provides an energizing signal on line 24 to one input of an AND gate 25. The other input of AND gate 25 is provided with an energizing pulse from the clock generator 12 after that pulse has been delayed by a delay circuit 67. The delay by circuit 67 need only be sufficiently long so as to permit the subtraction to take place within subtractor circuit 16 and the comparison to take place within threshold circuit 21. Accordingly, if a significant change has occurred in the video amplitude at a spatial point within the video frame such that the digital word on bus 20 has been determined to exceed a threshold level, the energizing signal on line 24 will permit the delayed energizing pulse from clock generator 12 to be coupled through AND gate 25 to one input of OR gate 26.

The output of OR gate 26 is connected by way of line 27 to a control input of transmission gate 15. Transmission gate 15 is actually constructed of a plurality of single-pole double-throw linear gates, one gate for each of the transmission paths present in bus 19. Transmission gate 15 is shown symbolically as a single-pole double-throw switch since the gate for each of the transmission paths normally connects its corresponding transmission path in bus 19 through to the corresponding transmission path in bus 17 in response to the delayed clock pulse on line 66 at the output of delay circuit 67. If, however, an energizing pulse is also applied to the control input of transmission gate 15 by way of line 27 from the output of OR gate 26, the transmission paths of but 19 are connected to the transmission paths of bus 14 rather than to the transmission paths of bus 17. Hence, if the digital word presented on bus 14 is deemed to represent a significant change in amplitude, the resulting energizing pulse on line 27 will cause that digital word to be coupled by way of bus 19 into frame memory 18. If, however, the digital word developed on bus 14 has been deemed to not represent a significant change in amplitude, the previously stored digital word corresponding to the same spatial point within the video frame is coupled from the output of frame memory 18 by way of bus 17 through transmission gate 15 by way of bus 19 to the input of frame memory 18. In this way, an entire frame of digital words representing amplitudes for each spatial point within the video frame is maintained in storage within frame memory 18, with each spatial point being updated with a new amplitude digital word only when that new digital word represents a significant change in amplitude.

Each energizing pulse from clock generator 12 is also coupled by way of line 13 to the input of an address generator 28. In response to each energizing pulse, address generator 28 provides a digital word on its output bus 29 whose value represents the location of the amplitude digital word simultaneously presented on bus 14. To conserve transmission bandwidth, each spatial point within the video frame need not have a unique address word developed by address generator 28. Instead, the address word developed on bus 29 represents the location of is corresponding sample on bus 14 within a subinterval of a video frame, i.e., within a single video line. In this case, line synchronization must of course be maintained between the transmitting and receiving locations in order to insure that each sample which is selected for transmission to the receiving location is properly placed withing the receiver's video frame memory.

As will be appreciated by those skilled in the art, samples are selected for transmission at a relatively random rate, the selection being dependent primarily on the type of activity taking place within the scene which is being viewed. As indicated hereinabove, a buffer memory is necessary in order to interface these randomly-selected samples with a digital transmission system which is operating at a constant rate. Accordingly, the energizing pulse online 27, developed when a sample has been selected for transmission, is coupled through an OR gate 41 to the write input of a buffer memory 23. In response to each energizing pulse produced on line 27, the amplitude digital word on bus 14 and its corresponding address digital word on bus 29 are coupled into storage within buffer memory 23. Buffer memory 23 may be constructed of a magnetic core memory along with the associated circuitry necessary to permit writing into and reading out of the core memory on a first-in, first-out basis.

The delayed clock pulse on line 66 is also coupled to the input of a divider circuit 30. Divider circuit 30 produces one energizing pulse at its output on line 31 for every N pulses provided on line 66 where N is an integer greater than one. Line 31 is connected to the read input of an auxiliary buffer memory 53 and to the control input of a digital transmitter 34. In a manner to be described hereinafter, auxiliary buffer memory 53 stores amplitude and address digital words presented on buses 57 and 44, respectively, in response to an energizing pulse on line 58 at its write input. An energizing pulse online 31 at the read input of auxiliary buffer memory 53 causes one amplitude digital word and its corresponding address word to be read out of memory 53 on a first-in, first-out basis and coupled by way of buses 51 and 52, respectively to the input of digital transmitter 34. In response to each pulse on line 31, digital transmitter 34 couples the amplitude and address digital word presented to it in parallel bit form on buses 51 and 52, respectively, to a transmission channel 35.

The integral value of N directly determines the amount of bandwidth compression developed by the conditional replenishment apparatus. The amount of bandwidth compression which may be permitted before degradation to the picture occurs depends on the average rate of selected samples which in turn depends on the type of scene normally viewed by the system. Video signals generated by viewing a rapidly moving sporting event would result in a higher average rate of selected samples than the video signals generated in a videotelephone service. For video signals generated in connection with a videotelephone service with amplitude and address digital words each having eight bits, an integral value of 16 for N has been determined to be acceptable. This value of N would result in a bit rate on transmission channel 35 equal to the sampling rate of analog-to-digital encoder 11, that is, one bit on transmission channel 35 for each 8-bit picture element. Since direct transmission of the samples would require a bit rate on transmission channel 35 eight times faster, a bandwidth compression ratio of 8 to 1 is said to be achieved.

The energizing pulse online 31 is also coupled to one input of an AND gate 55. Assuming for the moment that the inhibit input of AND gate 55 is not energized by an energizing signal on line 59, the energizing pulse from line 31 is coupled through AND gate 55 to one input of an OR gate 56 and to one input of an OR gate 32. The output of OR gate 56 is connected to the write input of auxiliary buffer memory 53. In response to each energizing pulse out of AND gate 55, the amplitude and address digital words stored in a one-word data store 33 are written into auxiliary buffer memory 53 by way of buses 57 and 44, respectively. The energizing pulse out of AND gate 55 is also coupled through OR gate 32 by way of line 36 to the read input of buffer memory 23. In response to each energizing pulse at its read input, one amplitude word and its corresponding address word are read out of buffer memory 23 on a first-in first-out basis and written into the one-word data store 33. Data store 33 is constructed in a manner such that presentation of new digital information from buffer memory 23 causes the new information to be stored and the previously stored information to be destroyed. If, however, the write input of auxiliary buffer memory 53 has been simultaneously energized along with the read input of buffer memory 23, this previously stored information in data store 33 will now appear within the auxiliary buffer memory 53.

Each energizing pulse on line 36 at the read input of buffer memory 23 is also connected to one input of a counter circuit 37. A second input of the counter circuit is connected to line 27 to receive the energizing pulses which are coupled to the write input of buffer memory 23. Each energizing pulse which is coupled to the write input causes counter circuit 37 to advance its count by one, whereas each energizing pulse which is coupled to the read input of buffer memory 23 causes counter 37 to decrease its count by one. Accordingly, the digital word provided by counter circuit 37 on bus 22 has a value equal to the number of total samples stored within buffer memory 23, each sample having both an amplitude and address digital word. As indicated hereinabove, this digital word on bus 22 is coupled to threshold circuit 21 and utilized as a parameter in determining the threshold level used by threshold circuit 21 in the aboveddescribed comparison process. As buffer memory 23 fills toward its maximum capacity, threshold circuit 21, in response to the increasing value of the digital word on bus 22, raises the threshold level. As a result, a new amplitude digital word on bus 14 must produce a greater valued digital word on bus 20 before it is judged to represent a significant change in amplitude such that transmission of that sample is warranted. When the number of samples stored in buffer memory 23 decreases, threshold circuit 21, in response to the lower-valued digital word on bus 22, lowers the threshold level. As a result, smaller differences between a new digital word on bus 14 and its corresponding digital word on bus 17 will be judged to be significant in that transmission of the new sample is warranted. In this way overflow and underflow of the buffer memory 23 are controlled The functional relationship between the threshold level in threshold circuit 21 and the amplitude value of the digital word on bus 22 need not be a linear relationship, as indicated in the above-identified copending application of F.W. Mounts, Ser. NO. 749,770.

The address digital word on bus 29 is coupled to the input of a frame address comparator 38 and also to the input of a detector circuit 39. Detector circuit 39 responds to only one of the digital words produced by address generator 28 in its entire group of address words. In the present embodiment where digital words at the output of address generator 28 represent the location of each sample within a single video line, detector 39 is constructed so as to respond to the first sample in the video line, that is, to respond to the address word produced on bus 29 which corresponds to the first sample in a video line. In response to receiving this address digital word, detector 39 produces an energizing signal on its output on line 40. This energizing signal is coupled through an OR gate 41 to the write input of buffer memory 23. As a result, a sample corresponding to this unique address is written into buffer memory 23 even though the sample may not represent a significant change in amplitude. In this way, line synchronization is maintained between the transmitting and receiving locations.

The energizing signal on line 40 is also coupled to the input of a counter circuit 42. Counter circuit 42 presents a digital word at its output on bus 43 whose value represent the number of the video line presently being considered within the video frame. Counter circuit 42 is constructed to recycle to its original or initial state after receiving a number of energizing signals from detector 39 equal to the number of video lines within the video frame. Consequently, the digital word on bus 43, when taken in combination with the digital word on bus 29, provides an address which indicates the unique spatial point location within the video frame for every amplitude digital word which is produced on bus 14.

The eight digital bits at the output of data store 33 which correspond to the address digital word are coupled by way of bus 44 to an input of frame address comparator 38 and also to an input of a detector circuit 45. Detector circuit 45 responds to the same address word as detector circuit 39 by providing an energizing signal on line 46 when this unique address word is received at the input of detector circuit 45. Each energizing signal on line 46 causes a counter circuit 47 to advance its count by one. Counter circuit 47, like counter circuit 42, is constructed to recycle to its initial state after receiving a number of energizing signals equal to the number of video lines within the video frame. Accordingly, the digital word provided on bus 48 at the output of counter circuit 47 has a value which represents the number of the video line within the video frame to which at the sample in data store 33 belongs. Hence, digital words on buses 44 and 48 indicate by their values the spatial point location within the video frame of the sample being stored in data store 33.

When the frame address comparator 38 detects that the frame address of the amplitude word on bus 14 is identical to the frame address of the sample presently being stored in data store 33, it produces an energizing pulse online 49 at one input of an AND gate 50. The other input of AND gate 50 is connected to the delayed clock pulse on line 26. If the energizing signal is present on line 49 when the delayed clock pulse appears on line 26, the clock pulse is coupled through AND gate 50 to one input of OR gate 32 and to one input of OR gate 26. As a result, this delayed clock pulse causes the new amplitude digital word on bus 14 to be written into buffer memory 23 and also causes a new amplitude digital word and its corresponding address word to be read out of buffer memory 23 into the one-word data store 33. When the sample in data store 33 is one other than the first sample in a video line, no energizing pulse is provided to the write input of auxiliary buffer memory 53, and the word previously stored within one-word data store 33 is destroyed and not entered into the auxiliary buffer memory 53. In this way, a previously stored amplitude for a spatial point of the video frame being stored within the buffer memory system is updated with new amplitude information providing the sample has not yet entered the auxiliary buffer memory 53. As a result, fewer amplitudes for any single spatial point are transmitted to the receiving location and, therefor, less delay is introduced as a result of rapid movement in the scene being viewed.

If the sample being stored within one-word data store 33 corresponds to the first sample in a video line, this sample is necessary in the receiving location in order to maintain line synchronization with the transmitting location. Accordingly, when the sample stored in data store 33 corresponds to the first sample in a video line, it must be coupled through to the digital transmitter 34 even though a new amplitude corresponding to that same spatial point is presently available for storage at the input of buffer memory 23. To achieve this result, the output of detector 45 is connected to one input of an AND gate 60, the other input of which is connected to the output of AND gate 50. If the sample stored within data store 33 corresponds to the first sample in a video line, detector 45 provides an energizing signal to one input of AND gate 60 and the energizing pulse provided at the output of AND gate 50 is permitted to pass through AND gate 60 to an input of OR gate 56. As a result, when the sample within data store 33 corresponds to he first sample in a video line, the write input of auxiliary buffer memory 53 is also energized by the energizing pulse produced as a result of a detected identity of addresses by frame address comparator 38.

This writing of the first sample in a video line into auxiliary buffer memory 53 may occur during intervals other than the one during which an energizing pulse is present on line 31. As a result, if every pulse on line 31 is permitted to be coupled through AND gate 55, the number of samples stored within auxiliary buffer memory 53 could increase in number since the write-in can occur more frequently than the pulses on line 31 and readout only occurs during the pulse on line 31. To prevent overflow of the auxiliary buffer memory 53, a counter circuit 54 has one of its inputs connected to the write input of auxiliary buffer memory 53 and the other one of its inputs connected to the read input of memory 53. Each energizing pulse at the write input causes counter 54 to advance its internal count by one, whereas each energizing pulse at the read input causes counter 54 to decrease its internal count by one. Consequently, the internal count registered by counter circuit 54 is an indication of the number of samples stored within auxiliary buffer memory 53.

Counter circuit 54 is constructed so as to provide an energizing signal on its output line 59 when the number of words stored in buffer memory 53 exceeds a predetermined number of words. An energizing signal on line 59 activates the inhibit input of AND gate 55 and thereby prevents the energizing pulses on line 31 from being coupled through AND gate 55 to the write input of buffer memory 53 and to the read input of buffer memory 23. The energizing pulses on line 31 may still, however, activate the read input of buffer memory 53. Accordingly, samples can be read out of auxiliary buffer memory 53 until the number of samples stored within this buffer memory is below he threshold level established by counter circuit 54. At this point, the energizing signal on line 59 is removed from the inhibit input of AND gate 55, and energizing pulses from line 31 are again coupled through AND gate 55 to both buffer memories 23 and 53.

Although the invention has been described in terms of an embodiment which utilizes a digital transmitter that removes samples from the auxiliary buffer memory at a constant rate, the invention should in no way be limited to this type of operation. Digital transmitter 34 may be time shared by several conditional replenishment apparatus in which case the readout of the auxiliary buffer memory 53 would occur in spurts, that is, only during the intervals when the auxiliary buffer memory is connected to the digital transmitter. The operation of the remainder of the apparatus would remain unchanged.

Numerous other modifications may be made to the above-described specific embodiment without departing from the spirit and scope of the present invention. For example, in a system in which each address work completely specifies the frame location of its corresponding sample, there is no necessity to insure that one selected sample from each subinterval of the video frame be transmitted and therefore the one-word data store in such a system could be connected directly to the digital transmitter without any intervening auxiliary buffer memory. Where each address word completely specifies the frame location, it is also of course not necessary to include the detector and counter circuits 39, 42, 45 and 47, since the frame address comparator circuit could determine an identity in frame locations by direct comparison of the appropriate two address words.

I claim:

1. In a redundancy reduction system wherein amplitude samples are selected from an input signal having frame intervals, each one of said amplitude samples having an address location in said frame interval, buffering apparatus for matching the relativity random rate of selected samples to the rate of a transmission system comprising a buffer memory means for storing the amplitude of each one of said selected samples along with its corresponding address, means responsive to said transmission system for reading out said buffer memory means at a rate which can be utilized by said transmission system, means for comparing the address of a new sample with the address of a stored sample in readiness to be read out to said transmission system, and means for writing the amplitude and address of said new sample into said buffer memory means and for reading out the amplitude and address of said sample in readiness in response to an output from said means for comparing when the address of said new sample and the address of said sample in readiness correspond to the same location in said frame interval.

2. Apparatus as defined in claim 1 wherein the address specifies the location of its corresponding sample within a subinterval of said frame interval and said means for comparing the address of a new sample with the address of a stored sample includes a first subinterval detector means responsive to a particular address of said new sample for providing a digital word whose value indicates the particular subinterval to which said new sample belongs, and further includes a second subinterval detector means responsive to a particular address of said stored sample for providing a digital word whose value indicates the particular subinterval to which said stored sample belongs.

3. Apparatus as defined in claim 2 wherein said first and second subinterval detector means each includes a detector circuit for providing an energizing signal in response to the detection of said particular address, and a counter circuit for providing a digital word whose value is a function of the number of energizing signals provided by said detector circuit.

4. Apparatus as defined in claim 3 wherein said first subinterval detector means further includes a means responsive to the energizing signal provided by said detector circuit of said first subinterval detector means for writing the address and amplitude of said new sample into said buffer memory means even though said new sample is not a selected sample.

5. Apparatus ad defined in claim 3 wherein said means for reading out said buffer memory means includes an auxiliary buffer memory means, means for reading out said auxiliary buffer means in response to an energizing pulse from said transmission system, and means for writing into said auxiliary buffer means both in response to said energizing pulse from said transmission system and in response to the simultaneous occurrence of an output from said means for comparing and energizing signal from said second subinterval detector means.

6. Apparatus as defined in claim 5 wherein said means for reading out said buffer memory means further includes means for counting the number of samples stored in said auxiliary buffer memory means and for providing an output signal when the number of samples stored in said auxiliary buffer memory means exceeds a predetermined number, and said means for writing into said auxiliary buffer memory means includes means responsive to said output signal for prohibiting writing into said auxiliary buffer memory means in response to said energizing pulse from said transmission system.

7. A conditional replenishment video system in which a video signal having frame intervals is sampled to provide amplitude digital words each one of which indicates by its value the amplitude of a video signal sample, means for generating address digital words each one of which indicates by its value the position of a corresponding one of said amplitude words in said frame interval, means for selecting the amplitude digital words which represent significant changes in amplitude from their corresponding amplitudes in a previous video frame, digital transmission apparatus, and buffer memory apparatus for coupling the selected amplitude digital words and their corresponding address words to said digital transmission apparatus; said buffer memory apparatus comprising a buffer memory means for storing selected amplitude digital words and their corresponding address words, means for reading out a stored amplitude and address digital word from said buffer memory means on a first-in first-out basis, means for coupling the readout amplitude and address digital word to said digital transmission apparatus, means for comparing the address word of a newly generated amplitude word with the address word of said stored amplitude word, and means for writing said newly generated amplitude and address digital word into said buffer memory means in response to said means for comparing when the address of said newly generated amplitude word and the address of said stored amplitude word correspond to the same position in said frame interval.

8. Apparatus as defined in claim 7 wherein each address digital word specifies the position of its corresponding sample within a subinterval of said frame interval and said means for comparing the address word of a newly generated sample with the address word of said stored sample includes a first subinterval detector means responsive to a particular address word of said newly generated sample for providing a digital word whose value indicates the particular subinterval to which said new sample belongs, and further includes a second subinterval detector means responsive to a particular address word of said stored sample for providing a digital word whose value indicates the particular subinterval to which said stored sample belongs.

9. Apparatus as defined in claim 8 wherein said first and second subinterval detector means each includes a detector circuit for providing an energizing signal in response to the detection of said particular address word, and a counter circuit for providing an output digital word whose value is a function of the number of energizing signals provided by said detector circuit.

10. Apparatus as defined in claim wherein said first subinterval detector means further includes a means responsive to the energizing signal provided by said detector circuit of said first subinterval detector means for writing the address and amplitude of said newly generated sample into said buffer memory means even though said newly generated sample is not a selected sample.

11. Apparatus as defined in claim 9 wherein said means for coupling the readout amplitude and address digital word to said digital transmission apparatus includes an auxiliary buffer memory means, means for reading out said auxiliary buffer means in response to an energizing pulse from said transmission system, and means for writing into said auxiliary buffer means both in response to said energizing pulse from said transmission apparatus and in response to the simultaneous occurrence of an output from said means for comparing and an energizing signal from said second subinterval detector means.

12. Apparatus as defined in claim 11 wherein said means for coupling the readout amplitude and address digital word to said digital transmission apparatus further includes means for counting the number of samples stored in said auxiliary buffer memory means and for providing an output signal when the number of samples stored in said auxiliary buffer memory means exceeds a predetermined number, and said means for writing into said auxiliary buffer memory means includes means responsive to said output signal for prohibiting writing into said auxiliary buffer memory means in response to said energizing pulse from said transmission apparatus.